(12) United States Patent
Park

(10) Patent No.: US 9,843,842 B2
(45) Date of Patent: Dec. 12, 2017

(54) CHANNEL DISPLAY APPARATUS AND METHOD OF CONTROLLING THE SAME

(71) Applicant: SAMSUNG ELECTRONICS CO., LTD., Suwon-si (KR)

(72) Inventor: Sung-sik Park, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/991,352

(22) Filed: Jan. 8, 2016

(65) Prior Publication Data
US 2016/0205434 A1    Jul. 14, 2016

(30) Foreign Application Priority Data
Jan. 9, 2015    (KR) ........................ 10-2015-0003473

(51) Int. Cl.
| | | |
|---|---|---|
| *H04N 21/482* | (2011.01) | |
| *H04N 21/2743* | (2011.01) | |
| *H04N 21/44* | (2011.01) | |
| *H04N 21/658* | (2011.01) | |
| *H04N 21/431* | (2011.01) | |

(52) U.S. Cl.
CPC ..... *H04N 21/4821* (2013.01); *H04N 21/2743* (2013.01); *H04N 21/44* (2013.01); *H04N 21/658* (2013.01); *H04N 21/4312* (2013.01)

(58) Field of Classification Search
None
See application file for complete search history.

(56) References Cited

U.S. PATENT DOCUMENTS

| | | | |
|---|---|---|---|
| 8,554,897 B2 | 10/2013 | Kim et al. | |
| 8,776,124 B2* | 7/2014 | Jin | ................. H04N 21/41407 725/41 |
| 2011/0119621 A1 | 5/2011 | Cho et al. | |
| 2012/0030554 A1* | 2/2012 | Toya | ................. H04N 7/17318 715/206 |
| 2015/0181261 A1* | 6/2015 | Kiok | ................. H04N 21/23109 725/41 |
| 2015/0373065 A1* | 12/2015 | Holmquist | ............ H04L 65/403 715/753 |

FOREIGN PATENT DOCUMENTS

| | | |
|---|---|---|
| JP | 2005110047 A | 4/2005 |
| JP | 200810998 A | 1/2008 |
| KR | 1020110054418 A | 5/2011 |
| KR | 101115942 B1 | 2/2012 |

* cited by examiner

*Primary Examiner* — Omar S Parra
(74) *Attorney, Agent, or Firm* — Sughrue Mion, PLLC

(57) ABSTRACT

Provided are channel display apparatuses and methods of operating the channel display apparatuses. The channel display apparatus includes a communicator that communicates with a network for sharing a plurality of real-time channel thumbnails; and a processor that controls the communicator to acquire at least one real-time channel thumbnail from among the plurality of real-time channel thumbnails and controls the communicator to transmit the acquired at least one real-time channel thumbnail to the network.

17 Claims, 9 Drawing Sheets

CHANNEL DISPLAY APPARATUS AND METHOD OF CONTROLLING THE SAME

CROSS-REFERENCE TO RELATED APPLICATION

This application claims the benefit of priority from Korean Patent Application No. 10-2015-0003473, filed on Jan. 9, 2015, in the Korean Intellectual Property Office, the disclosure of which is incorporated herein by reference in its entirety.

BACKGROUND

1. Field

Apparatuses and methods consistent with exemplary embodiments broadly relate to sharing channel thumbnails by using a television (TV) cloud network, and more particularly, to channel display apparatuses that secure real-time channel thumbnails with respect to a plurality of channels by sharing a thumbnail that is secured by each of display apparatuses and methods of controlling the channel display apparatuses.

2. Description of the Related Art

In a method of providing a channel thumbnail to facilitate the selection of a channel by a user, a real-time channel thumbnail which is a real-time captured still image may be provided in the most recent program of each of the channels.

However, in order to ensure a plurality of real-time channel thumbnails in a short time, a plurality of channel tuners are required. When a channel guide, for example, an electronic program guide (EPG) is executed, approximately 5 to 10 real-time channel thumbnails per page may be simultaneously required. However, a general TV includes only two tuners, that is, a main channel tuner and a second channel tuner.

When a real-time channel thumbnail is generated by using the second channel tuner, if there are many channels, it takes an excessively long time to acquire real-time channel thumbnails of all channels. Accordingly, when processing the real-time channel thumbnails by using only one channel tuner, that is, the second channel tuner, a long time may be required to acquire and display several real-time channel thumbnails.

Also, in the case of acquiring a real-time channel thumbnail through a broadcaster, there may be sometimes cases in which the broadcaster does not provide the real-time channel thumbnail, and thus, it is difficult to configure a consistent user environment.

Also, in order to display the channels in content groups of the same kind, rather than by a channel browsing type of the related art, and in order to display a channel combination of real-time channel thumbnails in a random order, it is difficult to secure effective real-time channel thumbnails of each of the channels.

Accordingly, in the related art, there is a need to develop a method of rapidly securing a plurality of real-time channel thumbnails by using hardware of the related art.

SUMMARY

Exemplary embodiments may overcome the above disadvantages and other disadvantages not described above. Also, the present disclosure is not required to overcome the disadvantages described above, and an exemplary embodiment may not overcome any of the problems described above.

Provided are channel display apparatuses and methods of controlling the channel display apparatus to reduce time required to acquire a thumbnail and to reduce the time required for UI configuration by generating a network and sharing a plurality of real-time channel thumbnails using this network in which the channel display apparatuses use the same broadcasters.

Additional aspects will be set forth in part in the description which follows and, in part, will be apparent from the description, or may be learned by practice of exemplary embodiments.

According to an aspect of an exemplary embodiment, a channel display apparatus comprises: a communicator configured to communicate with a network for sharing a plurality of real-time channel thumbnails; and a processor configured to control the communicator to acquire at least one real-time channel thumbnail from among the plurality of real-time channel thumbnails and to control the communicator to transmit the acquired at least one real-time channel thumbnail to the network.

The network may be a network in which the real-time channel thumbnails are exchanged between channel display apparatuses having a same unique ID, and the processor may further be configured to generate the unique ID based on regional information and channel information that are input during the initial channel setup, and the channel display apparatuses having the same regional information and the channel information may have the same unique ID.

The processor may control the communicator to transmit an acquired real-time channel thumbnail to a server in response to the acquired real-time channel thumbnail being the most recent one or not being available on the server based on a result of comparison between a real-time channel thumbnail that is stored by the channel display apparatus and the real-time channel thumbnail that is stored by the server.

The processor may acquire a real-time channel thumbnail by using a tuner in response to a request for a real-time channel thumbnail from a server, and the communicator may transmit the acquired real-time channel thumbnail to the server.

The processor may determine whether each of the real-time channel thumbnails expired based on an acquisition time of the respective stored real-time channel thumbnails, and may determine a priority order for requesting a real-time channel thumbnail from among the real-time channel thumbnails that are not stored or have expired, and the communicator may transmit a request for the real-time channel thumbnail according to the priority order.

The processor may control mobile devices that are connected to the channel display apparatus or that are recognized by the channel display apparatus to share with the acquisition of new real-time channel thumbnails by adding the mobile devices to the network.

The channel display apparatus may further include a display to display a screen that comprises at least one real-time channel thumbnail from among a plurality of real-time channel thumbnails on a user interface (UI).

According to yet another aspect of an exemplary embodiment. a channel display apparatus includes: a communicator configured to communicate with a network for sharing the plurality of real-time channel thumbnails; and a processor configured to control the communicator to setup a schedule for acquiring the plurality of real-time channel thumbnails by using tuners of channel display apparatuses, and configured to control the communicator to transmit a request for real-time channel thumbnails that need to be acquired from among the plurality of real-time channel thumbnails to the channel display apparatuses based on the schedule.

The network may be a network in which the real-time channel thumbnails are exchanged between the channel display apparatuses having a same unique ID, The processor may be configured to generate the unique ID based on regional information and channel information that are input during an initial channel setup, and the channel display apparatuses which have the same regional information and the channel information may have the same unique ID.

The processor may allocate an operation of updating the plurality of real-time channel thumbnails and an operation of acquiring new real-time channel thumbnails from among the plurality of real-time channel thumbnails to the channel display apparatuses.

The processor may determine a priority order of the real-time channel thumbnails that need to be acquired from among the plurality of real-time channel thumbnails, and may determine a schedule for acquiring the real-time channel thumbnails that need to be acquired based on the priority order, and the communicator may transmit a request for acquiring the real-time channel thumbnail to the channel display apparatuses according to the acquiring schedule.

The processor may determine an effectiveness and an order of generation of each of the plurality of real-time channel thumbnails based on an acquisition time of each of the real-time channel thumbnails, and may determine a priority order of acquisition of the real-time channel thumbnails based on the effectiveness and the order of generation, where the effectiveness is determined based on whether the acquisition time of the real-time channel thumbnails is greater than a predefined time.

The processor may transfer functions of the processor and the communicator to another channel display apparatus on the network in response to the channel display apparatus being changed to a power waiting mode or being turned off.

The processor may request a real-time channel thumbnail by activating a communicator of a channel display apparatus that is in a power waiting mode in response to requiring an additional channel display apparatus for acquiring and updating the real-time channel thumbnail.

According to yet another aspect of an exemplary embodiment, a method of controlling a channel display apparatus is provided. The method includes: communicating with a network for sharing a plurality of real-time channel thumbnails; acquiring at least one real-time channel thumbnail from among the plurality of real-time channel thumbnails; and transmitting the acquired at least one real-time channel thumbnail to the network.

According to yet another aspect of an exemplary embodiment, a method of controlling a channel display apparatus is provided. The method includes: communicating with a network for sharing a plurality of real-time channel thumbnails; setting up a schedule for acquiring the plurality of real-time channel thumbnails by using tuners of channel display apparatuses; and requesting a real-time channel thumbnail that needs to be acquired from among the plurality of real-time channel thumbnails to the channel display apparatuses based on the schedule.

According to yet another aspect of an exemplary embodiment, a non-transitory computer readable recording medium having recorded thereon programs for realizing one of the methods described above.

BRIEF DESCRIPTION OF THE DRAWINGS

These and/or other aspects will become more apparent and more readily appreciated from the following description of certain exemplary embodiments, taken in conjunction with the accompanying drawings, in which.

DETAILED DESCRIPTION OF EXEMPLARY EMBODIMENTS

Reference will now be made in detail to exemplary embodiments, examples of which are illustrated in the accompanying drawings. Exemplary embodiments may, however, be embodied in many different forms and should not be construed as being limited to exemplary embodiments set forth herein. Rather, exemplary embodiments are provided so that this disclosure will be thorough and complete, and will fully convey the scope of an inventive concept to those of ordinary skill in the art. Also, well-known functions or constructions are not described in detail since they would obscure the disclosure with unnecessary detail.

Terminologies used in the specification will be briefly described and exemplary embodiments will be described in detail.

Terminologies used herein are selected as commonly used by those of ordinary skill in the art in consideration of functions described in exemplary embodiments, but may vary according to the technical intention, precedents, or a disclosure of a new technology. Also, in particular cases, some terms are arbitrarily selected by the applicant, and in this case, the meanings of the terms will be described in detail at corresponding parts of the specification. Accordingly, the terms used in the specification should be defined not by simply the names of the terms but based on the meaning and contents of the whole specification.

It should be understood that, when a part "comprises" or "includes" an element in the specification, unless otherwise defined, it is not excluding other elements but may further include other elements. Also, in the specification, the term "units" or "module" described in the specification may denote a unit that processes at least a single function or operation, and this may be realized as hardware, software, or a combination of hardware and software.

In an exemplary embodiment, a real-time channel thumbnail may denote a thumbnail made of a still image captured in real-time in a broadcasting channel.

Figure 1A:
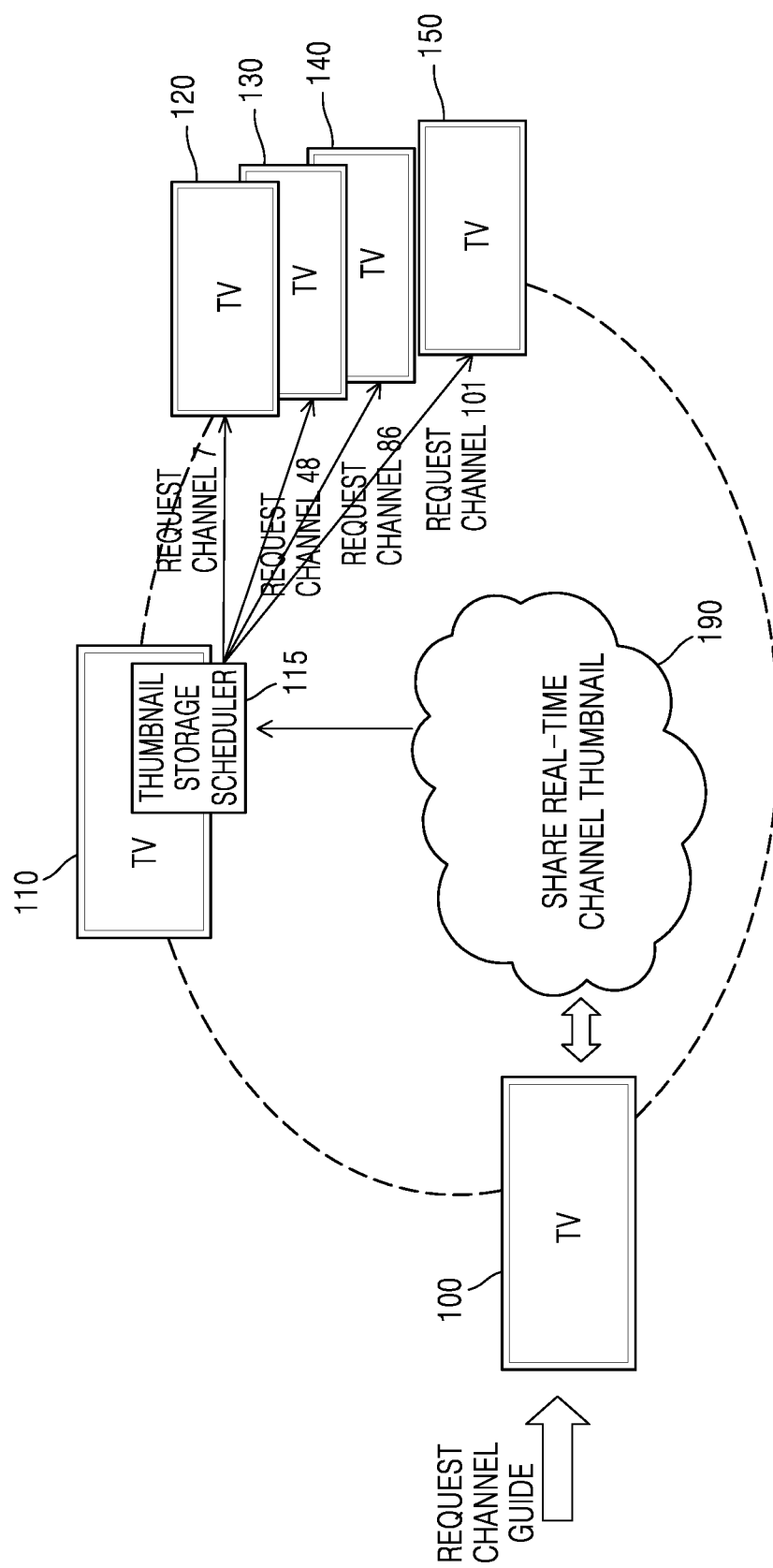
FIG. 1A is a view illustrating sharing of a real-time channel thumbnail via a network, according to an exemplary embodiment.

FIG. 1A is a view illustrating sharing of a real-time channel thumbnail via a network, according to an exemplary embodiment.

Referring to FIG. 1A, a TV 100 receives a request for a channel guide from a user. At this point, the TV 100 provides a real-time channel thumbnail of the most recent program of each channel to facilitate the channel selection for the user. Exemplary types of a real-time channel thumbnail will be described with reference to FIG. 1B.

In an exemplary embodiment, when a TV generates a real-time channel thumbnail by using a single second channel tuner, it may take a long time for the tuner to acquire or obtain thumbnails of all channels. Accordingly, according to an exemplary embodiment, the TV 100 may overcome this problem by sharing the real-time channel thumbnail via a network with other TVs 110, 120, 130, 140, and 150.

Here, the network may be a network in which the exchange of the real-time channel thumbnail is possible among TVs that share the same channel list. The network may include a wired network within a region.

The TVs that share the same channel list may be identified by the same unique ID. The unique ID may be generated based on regional information and channel information input when an initial channel setting of the TVs. The TVs having the same regional information and the channel information may have the same unique ID.

For example, TVs located in a first region in Seoul which is a capital city of Korea have the same channel list. For example, TVs located in the first region may have the same channel list in which channel No. 9 is set as KBS, channel No. 11 is set as MBC, and channel No. 6 is set as SBS. TVs that are located in a second region which is a different region from the first region may have a channel list in which channel No. 10 is set as KBS, channel No. 12 is set as MBC, and channel No. 5 is set as SBS. According to an exemplary embodiment, the TVs located in the first region may have a unique ID, for example, a seoul-1. According to an exemplary embodiment, if TVs having the unique ID of seoul-1 belong to the same network, a real-time channel thumbnail may be shared. However, TVs located in the second region have a different kind of channel list, and thus, may have another unique ID.

Each TV may join in an inter-TV network based on the unique ID of a channel list. More specifically, each TV may join the inter-TV network having the same unique ID. In addition to TV, other devices or apparatuses, such as tablets or smart phones that are able to connect to the same channel content may also join the network.

Referring to FIG. 1A, a network may include at least one TV 110 (hereinafter, a server 110) that functions as a server, and the TVs 120, 130, 140, and 150 may share real-time channel thumbnails by collecting them through the server 110. That is, the server 110 may function as a thumbnail storage.

If a real-time channel thumbnail of a specific channel is not on the network or there is a thumbnail that needs to be updated, the server 110 may request a real-time channel thumbnail to a TV in which a thumbnail generator is idle. That is, the server 110 may act as a thumbnail scheduler 115.

According to an exemplary embodiment, each of the TVs 120, 130, 140, and 150 that belong to the network may acquire a real-time channel thumbnail of each channel by requesting the real-time channel thumbnail of the server 110 through a tuner of each of the TVs. For example, the TV 120 may acquire a real-time channel thumbnail of channel No. 7 by requesting the real-time channel thumbnail from the thumbnail storage scheduler 115, and may transmit it to the server 110.

According to another exemplary embodiment, each of the TVs 120, 130, 140, and 150 may update the real-time channel thumbnail shared on the network by the self-decision not by the request of the server 110. For example, after comparing a real-time channel thumbnail that is stored by-itself and a real-time channel thumbnail that is stored by the network, if the real-time channel thumbnail acquired by it-self is the most recent real-time channel thumbnail or the real-time channel thumbnail does not exist in the server 110, each of the TVs 120, 130, 140, and 150 may update the real-time channel thumbnail by transmitting the acquired real-time channel thumbnail to the server 110.

According to an exemplary embodiment, the TVs 120, 130, 140, and 150 that are joined in the network, according to the request of the thumbnail scheduler 115, may acquire the real-time channel thumbnail of a requested channel and may share with the other TVs 120, 130, 140, and 150 through the server 110 on the network. Accordingly, the TVs 120, 130, 140, and 150 that belong to the network may acquire an effective real-time channel thumbnail among all the channels in real time.

In FIG. 1A, one of the TV 110 included in the network functions as a server. However, for a further smooth network management, a server that may be operated round-the-clock may be added by TV manufacturers or a network operating company. In this case, the functions of the thumbnail storage and the thumbnail scheduler 115 that are performed by the TV 110, that is, the existing server 110 may be performed by the additional server. Also, the TV 110 may function as a TV included in the network that may request and provide real-time channel thumbnail to its user, according to an exemplary embodiment.

Also, in FIG. 1A, the TVs 120, 130, 140, and 150 are mainly described. However, an exemplary embodiment is not limited thereto, that is, the apparatuses or devices for sharing a real-time channel thumbnail may include all channel display devices, such as, mobile apparatuses, smart phones, TVs, laptops, personal computers, and PDAs that are able to be connected to the same channel content.

Figure 1B:
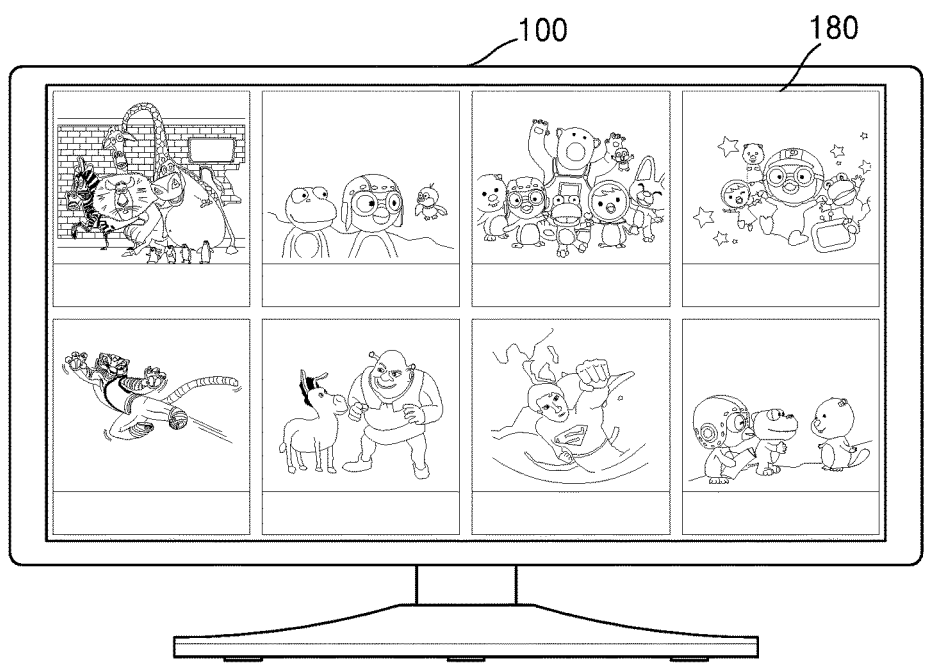
FIG. 1B is a view illustrating a real-time channel thumbnail according to an exemplary embodiment.

FIG. 1B is a view illustrating a real-time channel thumbnail according to an exemplary embodiment.

Referring to FIG. 1B, a TV 100 that displays real-time channel thumbnails 180 is depicted. The TV 100 displays 8 real-time channel thumbnails 180. However, an exemplary embodiment is not limited thereto, that is, the TV 100 may display more or less than 8 real-time channel thumbnails 180. Various real-time channel thumbnail screens may be configured according to the request of a user. For example, there may be real-time channel thumbnail screens that display only public TV contents, real-time channel thumbnail screens that include only sports channels, and real-time channel thumbnail screens that include only kids channels.

The real-time channel thumbnails may not be meaningful after an hour from the moment of the user's request, and thus, an update may be required. However, since a TV includes only one or two tuners which are very few when compared to the large number of channels, a rapid update is possible through sharing of the real-time channel thumbnails on the network.

According to an exemplary embodiment, all of the real-time channel thumbnails may be secured within a short period of time. Accordingly, when a user environment is configured to an arbitrary combination in which the real-time channel thumbnails are not displayed in an existing channel order and kind of channels or kind of contents, that is, a movie channel collection or a sports program collection are not in a channel order, a rapid user environment may be configured based on the all secured real-time channel thumbnails.

Figure 2:
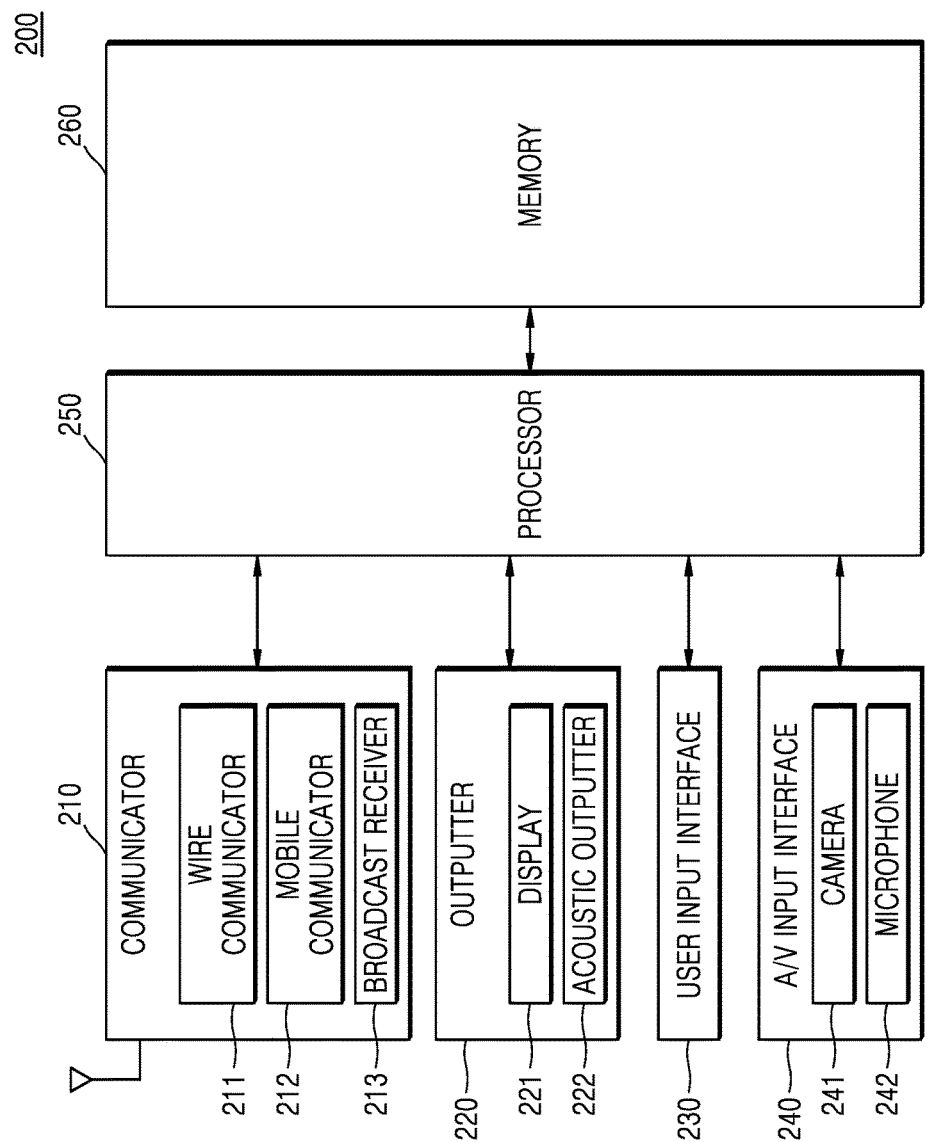
FIG. 2 is a block diagram illustrating a channel display apparatus according to an exemplary embodiment.

FIG. 2 is a block diagram illustrating a channel display apparatus according to an exemplary embodiment.

As depicted in FIG. 2, the channel display apparatus 200 according to an exemplary embodiment may include a communicator 210, an outputter 220, a user input interface 230, an A/V input interface 240, a processor 250, and a memory 260. However, the depicted constituent elements are not requisite elements but provided by way of an example and not by way of a limitation. The channel display apparatus 200 may be realized with more constituent elements or less constituent elements than that are depicted in FIG. 2.

According to an exemplary embodiment, each of the constituent elements of FIG. 2 will be described below in further detail.

The communicator 210 may include at least one constituent element for communication between a network or a server. For example, the communicator 210 may include a wire communicator 211, a mobile communicator 212, and a broadcast receiver 213.

The communicator 210 may be connected to the network through a LAN or a WAN by including a LAN card.

The wireless communicator 212 may support a plurality of local area communication functions. A local area communication technique according to an exemplary embodiment may include Wi-Fi, Bluetooth, Zigbee, Wi-Fi Direct (WFD), ultra wideband (UWB), and infrared Data Association (IrDA), but is not limited thereto.

The broadcast receiver 213 may receive a broadcasting signal and/or information related to the broadcasting from the outside through a broadcasting channel. The broadcasting channel may include satellite channels and ground wave channels. The broadcast receiver 213 may include at least one tuner.

The broadcast receiver 213 may acquire real-time channel thumbnails of the broadcasting channel through the tuner. More specifically, according to an exemplary embodiment, the broadcast receiver 213 may generate real-time channel thumbnails by capturing still images of the broadcasting channel received through the tuner.

The outputter 220 is included to outputs an audio signal, a video signal, and/or vibration (haptic) signal, and may include a display 221, an acoustic outputter 222, and a vibration motor (not shown).

The display 221 may be configured including one of a light emitting diode (LED), a liquid crystal display (LCD), an organic electroluminescence (EL), and a plasma display, and outputs information processed in the channel display apparatus 200 by displaying it. For example, the display 221 may display a broadcasting channel or may output an image that includes one or more real-time channel thumbnails.

The acoustic outputter 222 outputs audio data that is received from the communicator 210 or stored in the memory 260. Also, the acoustic outputter 222 outputs an acoustic signal related to a function (for example, broadcasting sound, message receiving sound, etc) that is performed in the channel display apparatus 200. The acoustic outputter 222 may include a speaker or a buzzer.

The user input interface 230 may denote an element for inputting data to control the channel display apparatus 200. For example, the user input interface 230 may include a key pad, a dome switch, a touch pad (a capacitive overlay type, a resistive overlay type, an infrared beam type, an integral strain gauge type, a surface acoustic wave type, a piezoelectric type), a jog wheel, a jog switch, or a remote control, provided by way of an example but not limited thereto.

The A/V input interface 240 is for inputting an audio signal or a video signal, and may include a camera 241, a microphone 242, etc. the camera 241 may acquire an image frame, such as, a still image or a motion picture through an image sensor. An image captured through the image sensor may be processed in the processor 250 or an additional processor (not shown). The processed image frame may be displayed on the display 221, may be stored in the memory 260, or may be transmitted to the outside through the communicator 210. More than two cameras 241 may be included according to the configuration type of the channel display apparatus 200.

The microphone 242 processes an acoustic signal received from the outside to electrical acoustic data.

The processor 250 generally controls overall operations of the channel display apparatus 200. That is, the processor 250 may control the communicator 210, the outputter 220, the user input interface 230, the A/V input interface 240, and the memory 260 by executing programs stored in the memory 260.

The processor 250 may be a processor, a central processor unit (CPU), or a controller, provided by way of an example but is not limited thereto.

The processor 250 may include an application processor 251 and a communication processor 252. The application processor 251 may control the executions of various applications stored in the memory 260. The communication processor 252 may control various communication functions.

The memory 260 may store programs for processing and controlling of the processor 250, and may store data input to and output from the channel display apparatus 200.

The memory 260 may include at least one type of storage medium selected from among a flash memory type, a hard disk type, a multimedia card micro type, a card type memory (for example, SD or XD memory, etc.), a random access memory (RAM) a static random access memory (SRAM), a read-only memory), an electrically erasable programmable read-only memory (EEPROM), a programmable read-only memory (PROM), a magnetic memory type, a magnetic disc type, or an optical disc type. Also, the channel display apparatus 200 may operate a web storage that performs a storage function of the memory 260 on the internet, according to an exemplary embodiment.

The memory 260 may recognize a voice of a user by using an acoustic recognition engine, and may include an acoustic recognition module (not shown) for transmitting the recognized voice to the processor 250.

An alarm module (not shown) may generate a signal for notifying an occurrence of an event in the channel display apparatus 200. Examples of the event that may occur in the channel display apparatus 200 may be receiving a message, a key input signal, or a notification of a schedule, etc. the alarm module may be output as a video signal type through the display 221, may be output as an audio type signal through the acoustic outputter 222, or may be output as a vibration or other haptic signal type through a motor such as the vibration motor (not shown).

Figure 3A:
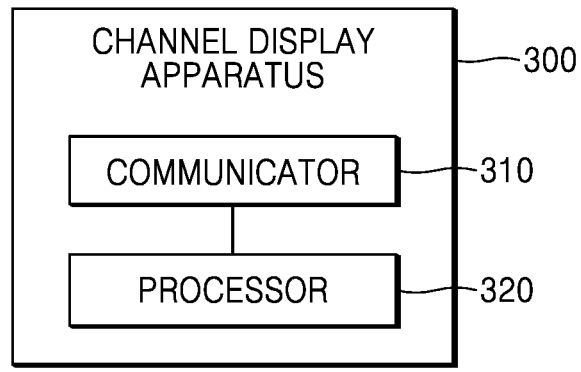
FIGS. 3A and 3B are block diagrams illustrating a configuration of a channel display apparatus operating as a client, according to an exemplary embodiment.
Figure 3B:
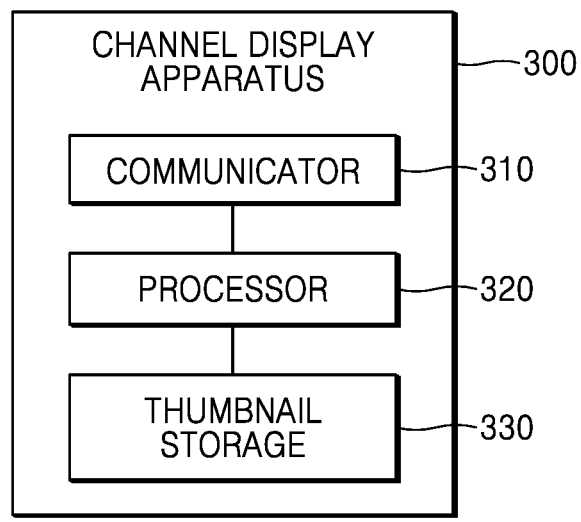

FIGS. 3A and 3B are a block diagrams illustrating a configuration of a channel display apparatus 300 operating as a client, according to an exemplary embodiment.

As depicted in FIG. 3A, the channel display apparatus 300 may include a communicator 310 and a processor 320. The communicator 310 and the processor 320 may be somewhat analogous to the communicator 210 and the processor 250 of FIG. 2, according to an exemplary embodiment.

The communicator 310 communicates with a network for sharing a plurality of real-time channel thumbnails. For example, the communicator 310 may join in a network of TV sharing the same channel list based on a unique ID that is determined based on channel information. According to an exemplary embodiment, the channel display apparatus 300 may share a plurality of real-time channel thumbnails on the network.

The processor 320 may control the communicator 310 to acquire or obtain at least one real-time channel thumbnail from among a plurality of real-time channel thumbnails and to transmit the acquired at least one real-time channel thumbnail to the network. According to an exemplary embodiment, the processor 320 may add an acquisition time to the acquired real-time channel thumbnail. The acquisition time may be a time when the real-time channel thumbnail is acquired through a tuner of the channel display apparatus 300. More specifically, the processor 320 may attach a tag as 20140708071108 with respect to the real-time channel thumbnail acquired at 07:11:08, on Jul. 8, 2014. The types of tags may be changed according to an exemplary embodiment. Also, the processor 320 may add a tag comprising channel information to the real-time channel thumbnail in addition to the acquisition time. For example, the processor 320 may attach a tag as an acquired first real-time channel thumbnail is KBS and an acquired second real-time channel thumbnail is SBS. These tags are provided by way of an example and not by way of a limitation. For example, a single tag may have a time stamp of when the real-time channel thumbnail was obtained and a channel name. The tag or another tag may include additional information such as genre, name of the current program, main actor, and so on.

Also, the processor 320 may determine the effectiveness of a real-time channel thumbnail based on the acquisition time of the real-time channel thumbnail. For example, if 60 seconds is preset as a reference time, the processor 320 may determine a real-time channel thumbnail as ineffective when 60 seconds from the acquisition time of the real-time channel thumbnail elapses. This is provided by way of an example and not by way of a limitation.

Also, the processor 320 may determine a priority order for requesting a real-time channel thumbnail of not storing, as requested by a user or expiration time for the real-time channel thumbnails may be based on the request of a user. For example, if the user requests a public channel list, the processor 320 may decide that a real-time channel thumbnail of a public channel is needed, and thus, may determine the request for real-time channel thumbnails of channels corresponding to MBC, SBS, KBSI, and KBS II is in high priority.

Accordingly, the processor 320 may control the communicator 310 to transmit a request for acquiring a real-time channel thumbnail to a server of a network according to the determined priority order.

Also, the processor 320 may control the communicator 310 to receive at least one real-time channel thumbnail from among the plurality of real-time channel thumbnails from the network.

The processor 320 may control the communicator 310 to acquire a real-time channel thumbnail and to transmit it to the server according to the request from the server.

For example, if there is a request from the server, the processor 320 may acquire the requested real-time channel thumbnail through the communicator 310. According to an exemplary embodiment, the communicator 310 may share the acquired real-time channel thumbnail.

The sharing of the acquired real-time channel thumbnail may denote that the transmission of the acquired real-time channel thumbnail to the server by the channel display apparatus 300 according to the request from the server or update of the shared real-time channel thumbnail.

For example, the communicator 310 may transmit the acquired real-time channel thumbnail to the server according to the request from the server.

Also, the communicator 310 may compare a real-time channel thumbnail that the channel display apparatus 300 has and a real-time channel thumbnail that the server of the network has. If the server does not have the most recent acquired real-time channel thumbnail, the communicator 310 may transmit the acquired real-time channel thumbnail to the server.

The channel display apparatus 300 may further include the display 221 (not shown in FIG. 3). The display 221 may display a real-time channel thumbnail on a user interface (UI). The UI may denote the screen configured by a plurality of real-time channel thumbnails depicted in FIG. 1B, but is provided by way of an example and is not limited thereto. An entire screen that includes real-time channel thumbnails may be configured to an UI.

Also, according to another exemplary embodiment, the channel display apparatus 300 may control mobile devices that are connected to or recognized by the channel display apparatus 300 to co-operate in the acquisition of a real-time channel thumbnail by adding the mobile devices to the network FIG. 3B is a block diagram illustration a configuration in which the channel display apparatus 300 is operating as a server, according to an exemplary embodiment.

As depicted in FIG. 3B, the channel display apparatus 300 may include the communicator 310, a processor 320, and a thumbnail storage 330.

The operation of the channel display apparatus 300 is described with a TV as an example of the channel display apparatus 300, according to an exemplary embodiment.

The communicator 310 may communicate with a network for sharing a plurality of real-time channel thumbnails. For example, the communicator 310 may open a network or join in a network of TVs having the same channel list based on a unique ID of each of the TVs.

The processor 320 may setup a schedule for acquiring a plurality of real-time channel thumbnails of the channel display apparatuses by using a tuner, and based on the schedule, may request a real-time channel thumbnail that needs to be acquired from among the real-time channel thumbnails to the channel display apparatuses.

Also, the processor 320 may allocate an operation of updating the received real-time channel thumbnail and an operation of acquiring new real-time channel thumbnail from among the plurality of real-time channel thumbnails. For example, the processor 320 may setup a schedule indicating which TV from among a number of channel display apparatuses on the network will acquire a real-time channel thumbnail of a particular broadcasting channel. According to an exemplary embodiment, the communicator 310 may request one or more of the TVs to acquire a real-time channel thumbnail that needs to be acquired from among the plurality of real-time channel thumbnails.

If there is any real-time channel thumbnail that needs to be acquired, the processor 320 may find a TV that is joined in the network and a thumbnail generator of which is idle, and may request this TV to generate a real-time channel thumbnail.

Also, if there is no TV with an idle thumbnail generator, the processor 320 may allocate the operation to another channel display apparatus 300 in the network.

For example, the processor 320 may allocate the acquisition operation of a real-time channel thumbnail of channel 9 to a first channel display apparatus that belongs to the network and may allocate the acquisition operation of a real-time channel thumbnail of channel 11 to a second channel display apparatus that belongs to the network. This is provided by way of an example and not by way of a limitation. One channel display apparatus may be tasked with acquiring thumbnails of different channels.

The schedule setup executed by the processor 320 will be described in detail with reference to FIG. 8, according to an exemplary embodiment.

The communicator 310 may share the acquired real-time channel thumbnails on the network. For example, the communicator 310 may receive a plurality of real-time channel thumbnails from the TVs and may share them on the network. Also, when at least one TV of the TVs that belong to the network requests a real-time channel thumbnail, the communicator 310 may transmit the requested real-time channel thumbnail from among the real-time channel thumbnails to the TV.

The thumbnail storage 330 may correspond to the memory 260 of FIG. 2. The thumbnail storage 330 may store the received real-time channel thumbnails. According to an exemplary embodiment, the stored real-time channel thumbnails may be shared on the network through the communicator 310. Also, when at least one TV of the TVs that belong to the network requests for a real-time channel thumbnail, the thumbnail storage 330 may transmit the requested real-time channel thumbnail to the communicator 310.

The channel display apparatus 300 may set the real-time channel thumbnails to be shared quickly with the other TVs by attaching tags to the real-time channel thumbnails and by classifying, storing, and managing the real-time channel thumbnails.

According to another exemplary embodiment, if the channel display apparatus 300 is changed to a waiting mode or power is terminated, the channel display apparatus 300 may transfer the functions of thumbnail scheduling and the thumbnail storing to another channel display apparatus connected to the network.

According to an exemplary embodiment, when an additional operating device required for acquiring and up-dating a real-time channel thumbnail on the network is needed, in an IP based broadcasting network (IPTV), the channel display apparatus 300 may share the generating and acquiring a real-time channel thumbnail by adding a mobile device that is connected to or recognized by a TV.

Also, the channel display apparatus 300 may request a thumbnail by activating the thumbnail generator and the communicator 310 of a device in a power waiting state (for example, smart phones, tablets, or information devices, etc.). For example, in a network, at least 20 devices should be in operation to maintain the update schedule of a real-time channel thumbnail. However, if only 10 devices are in operation in the network, the channel display apparatus 300 may request a thumbnail by waking up essential constituent elements of the devices in the power waiting state. More specifically, the channel display apparatus 300 may request a real-time channel thumbnail by waking a thumbnail generator and a sharer of devices in the power waiting state through a WAKE command transmitted on LAN.

Figure 4:
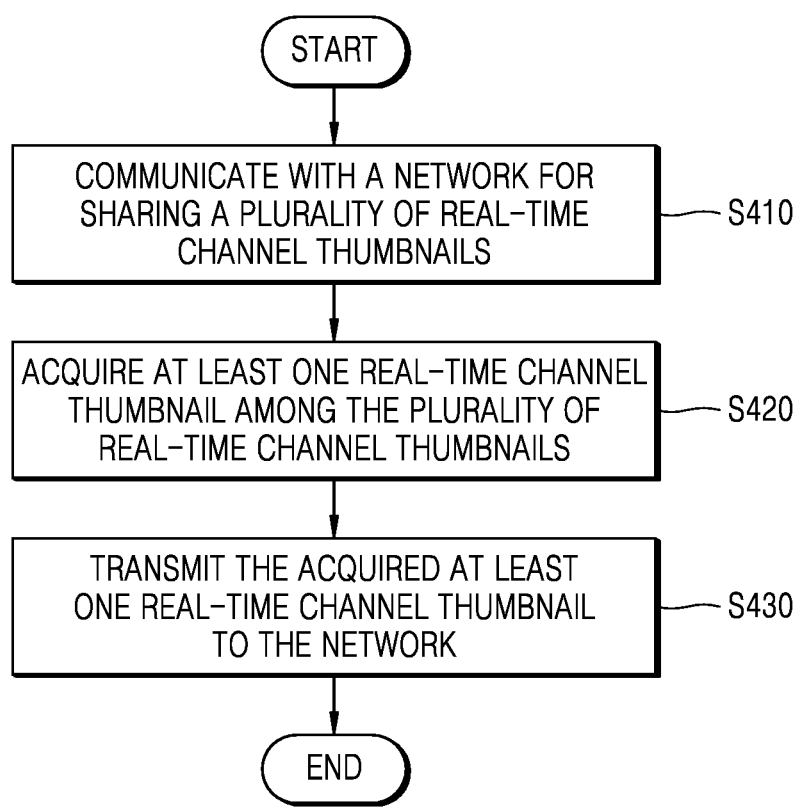
FIG. 4 is a flowchart illustrating a process of a channel display apparatus operating as a client connected to a network, according to an exemplary embodiment.

FIG. 4 is a flowchart illustrating a process in which the channel display apparatus 300 is operating as a client, according to an exemplary embodiment.

In operation 410, the channel display apparatus 300 may communicate with a network for sharing a plurality of real-time channel thumbnails. For example, the channel display apparatus 300 may join in a network for sharing a plurality of real-time channel thumbnails between TVs having the same channel list based on a unique ID that is determined based on channel information.

In operation 420, the channel display apparatus 300 may acquire at least one real-time channel thumbnail from among a plurality of real-time channel thumbnails by using a tuner. The type of thumbnail to be acquired may be determined according to an acquisition priority order.

For example, the channel display apparatus 300 may acquire a real-time channel thumbnail of high priority through a tuner based on the request of the user, or may acquire a real-time channel thumbnail through a tuner based on the request of a server in the network.

In operation 430, the channel display apparatus 300 may transmit an acquired real-time channel thumbnail to a network. For example, the channel display apparatus 300 may transmit the acquired real-time channel thumbnail to the server of the network. More specifically, if the acquired real-time channel thumbnail is the most recent thumbnail or is not present on the server, the channel display apparatus 300 may transmit the acquired real-time channel thumbnail to the server.

Also, according to an exemplary embodiment, the channel display apparatus 300 may receive at least one of the plurality of real-time channel thumbnails shared on the network through the network.

Figure 5:
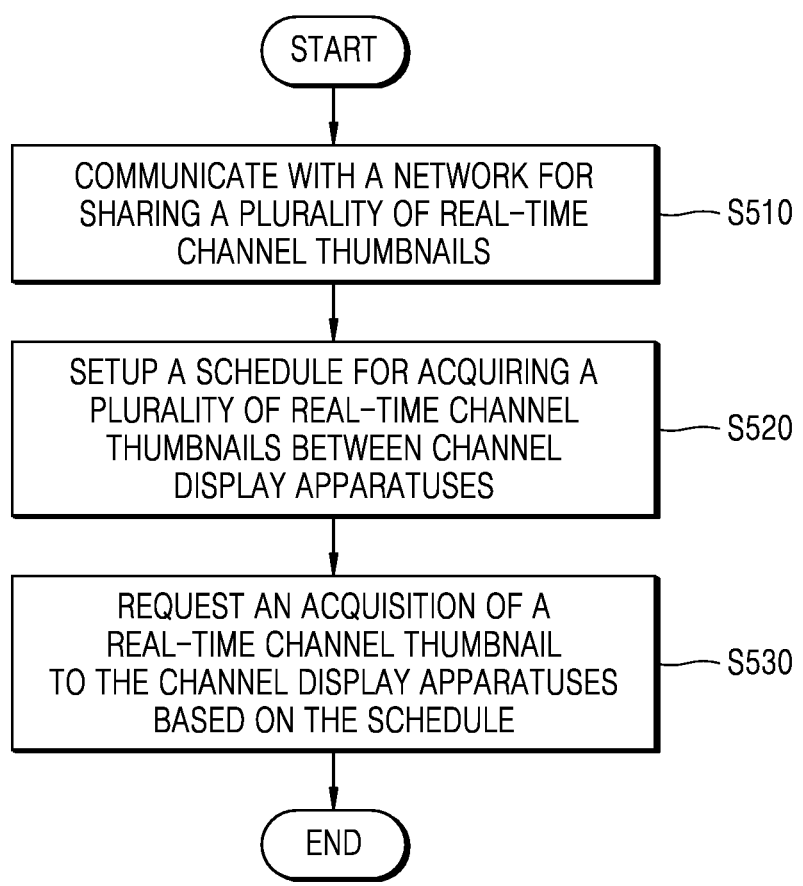
FIG. 5 is a flowchart illustrating a process of a channel display apparatus operating as a server, according to an exemplary embodiment.

FIG. 5 is a flowchart illustrating a process in which the channel display apparatus 300 is operating as a server in the network, according to an exemplary embodiment.

In operation 510, the channel display apparatus 300 may communicate with a network for sharing a plurality of real-time channel thumbnails. For example, the channel display apparatus 300 may form a network for sharing a plurality of real-time channel thumbnails between TVs having the same channel list based on a unique ID that is determined based on channel information.

For example, the channel display apparatus 300 may generate a unique ID based on regional information and channel information input at the initial channel set-up, and may form a network for sharing a real-time channel thumbnail between devices having the same unique ID.

In operation 520, the channel display apparatus 300 may setup a schedule for acquiring a plurality of real-time channel thumbnails by using a tuner between TVs in the network. For example, the channel display apparatus 300 may generate tasks that include an update time and an update body (channel display apparatuses) of each of the real-time channel thumbnails and may generate a table with a schedule in which the tasks are allocated to the TVs in the network.

In operation 530, the channel display apparatus 300 may request the other TVs in the network to obtain or acquire a real-time channel thumbnail based on the schedule. According to an exemplary embodiment, the TVs that constitute the network may acquire a real-time channel thumbnail requested by the channel display apparatus 300 through a tuner, and may transmit the acquired real-time channel thumbnail to the channel display apparatus 300 through the network.

According to an exemplary embodiment, the channel display apparatus 300 may share a plurality of real-time channel thumbnails through a network. More specifically, the channel display apparatus 300 may transmit the plurality of real-time channel thumbnails to the TVs in the network. For example, the channel display apparatus 300 that functions as a server may classify the real-time channel thumbnails received from the TVs that function as clients based on channel information and acquired time, and may transmit them to the TVs. Accordingly, each of the TVs in the network may secure the real-time channel thumbnails quickly and provide not stale or expired real-time channel thumbnails.

Figure 6:
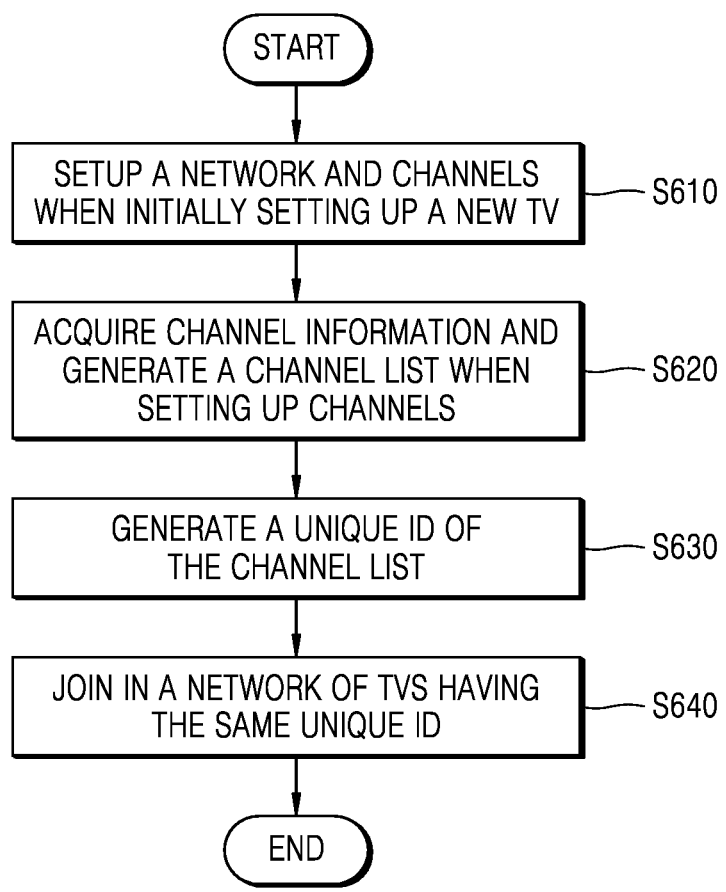
FIG. 6 is a flowchart illustrating a process of channel display apparatus' operations as a network client joins a network, according to an exemplary embodiment.

FIG. 6 is a flowchart illustrating a process in which the channel display apparatus 300 operating as a network client is joining a network, according to an exemplary embodiment.

In operation 610, when the channel display apparatus 300 is initially set up, a network and a channel may be set. For example, when a TV is being set up after a new one is purchased, a network setting and a channel setting are performed.

In operation 620, the TV may acquire channel information and may generate a channel list when the channel setting is performed. In operation 630, the TV may generate a unique ID of the channel list based on the generated channel list. More specifically, when a channel is set, each TV acquires channel information and generates a channel list based on the channel information. According to an exemplary embodiment, the unique ID of the channel list is generated according to a predefined reference, and, in the case of the TVs having the same unique ID, the same content may be broadcast at the same channel number.

In operation 640, the TV may join in a network of TVs having the same channel list based on the same unique ID for the channel list.

Figure 7:
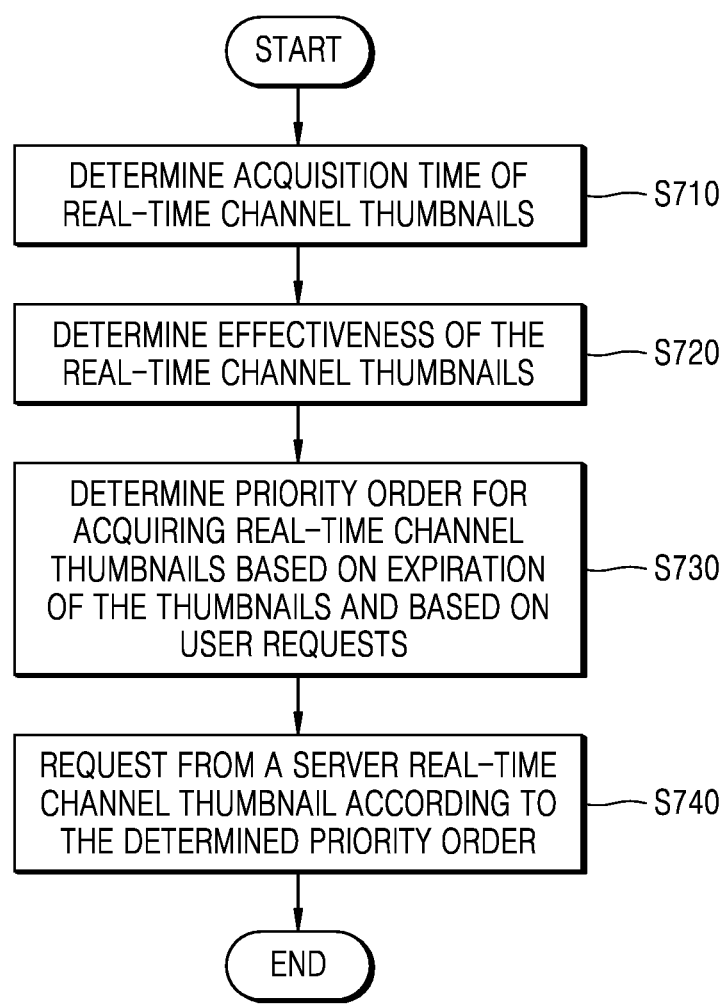
FIG. 7 is a flowchart illustrating a process of channel display apparatus' operations as a network client determines an order of priority for acquiring a real-time channel thumbnail and requests the real-time channel thumbnail, according to an exemplary embodiment.

FIG. 7 is a flowchart illustrating a process in which the channel display apparatus 300 operating as a network client determines an order of priority for acquiring a real-time channel thumbnail and requests the real-time channel thumbnail, according to an exemplary embodiment.

In operation 710, the channel display apparatus 300 may determine an acquisition time for each of the real-time channel thumbnails that are stored in the channel display apparatus 300. The acquisition time of the real-time channel thumbnail may be found from an acquisition time tag attached to each of the real-time channel thumbnails. In the case when the channel display apparatus 300 acquires a real-time channel thumbnail by itself through a tuner or receives it from a server, the acquisition time of the real-time channel thumbnail may be determined by the acquisition time tag.

In operation 720, the channel display apparatus 300 may determine the effectiveness of the real-time channel thumbnails. The effectiveness of each of the real-time channel thumbnails may be determined based on whether the acquisition time of each of the real-time channel thumbnails is greater than a predefined time. In an exemplary embodiment, the real-time channel thumbnail may be effective if it has not yet expired based on a predefined time.

In operation 730, the channel display apparatus 300 may determine a priority order of the real-time channel thumbnails that need to be acquired based on the effectiveness (expiration) and the user's request.

For example, if the user requests the real-time channel thumbnails of channel Nos. 9 and 11 but the real-time channel thumbnails of channel Nos. 1, 3, 9, and 11 are not effective (have expired), the real-time channel thumbnails of the channel Nos. 9 and 11 may be in a high priority order as opposed to channels Nos. 1 and 3 and will be acquired first.

In operation 740, the channel display apparatus 300 that functions as a client may request from the server to obtain or acquire a real-time channel thumbnail according to the determined priority order. According to an exemplary embodiment, the server may setup a schedule for acquiring real-time channel thumbnails that have expired (ineffective). The schedule setup, according to an exemplary embodiment, will be described with reference to FIG. 8.

Figure 8:
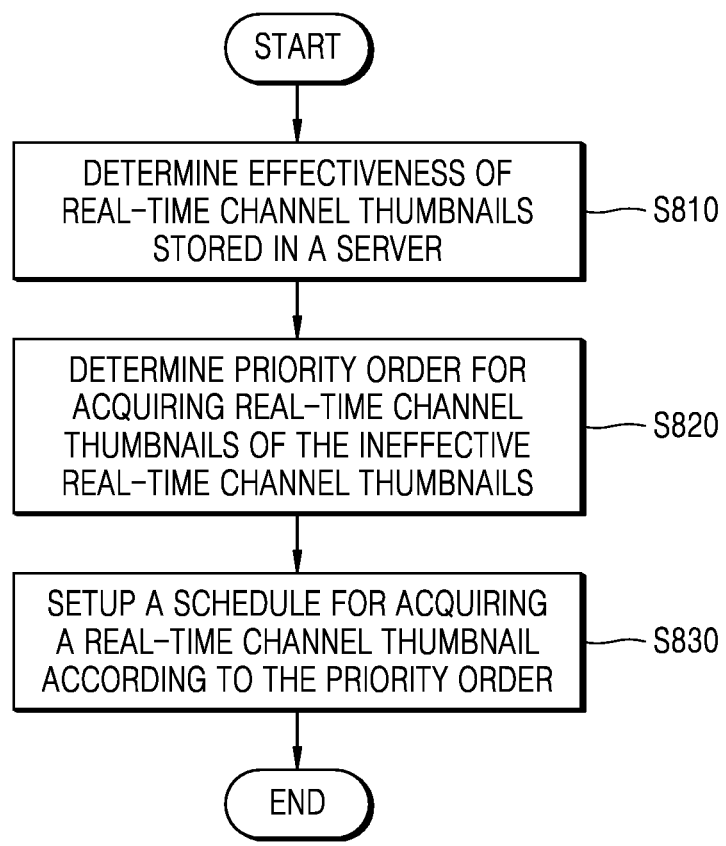
FIG. 8 is a flowchart illustrating a process of channel display apparatus's operations as a server schedules acquirement of a real-time channel thumbnail, according to an exemplary embodiment.

FIG. 8 is a flowchart illustrating a process in which the channel display apparatus 300 operating as a server schedules for acquiring a real-time channel thumbnail, according to an exemplary embodiment.

According to an exemplary embodiment, the channel display apparatus 300 may determine a priority order for acquiring the real-time channel thumbnails from among a plurality of real-time channel thumbnails, and based on the priority order, the channel display apparatus 300 may determine a schedule for acquiring the needed real-time channel thumbnails. This process will be described below with reference to FIG. 8, according to an exemplary embodiment.

In operation 810, the channel display apparatus 300 may distinguish the effectiveness (still good versus expired) of real-time channel thumbnails stored in the server based on acquisition times. For example, the channel display apparatus 300 that functions as a server may distinguish or determine the acquisition times of the real-time channel thumbnails and based on the determined times, determine whether or not the acquisition times is greater than a predefined time. For example, if the predetermined time is 60 seconds, the channel display apparatus 300 that functions as a server may distinguish or determine a real-time channel thumbnail that is generated 2 minutes ago as ineffective.

In operation 820, the channel display apparatus 300 may determine a priority order for acquiring real-time channel thumbnails to replace the ineffective (expired) real-time channel thumbnails.

The ineffective or expired real-time channel thumbnails need to be re-acquired. However, the priority order of the re-acquisition may be a problem. For example, if there are 10 ineffective real-time channel thumbnails, the 10 ineffective real-time channel thumbnails may not be acquired at the same time, but should be re-acquired in a predetermined order, e.g., sequentially. According to an exemplary embodiment, the acquisition time of the real-time channel thumbnails and the request of the user may be considered.

For example, the channel display apparatus 300 that functions as a server may classify the real-time channel thumbnails to be re-acquired based on the acquisition time and may determine a re-acquisition priority order. More specifically, some real-time channel thumbnails, the acquisition time thereof has lapsed (expired), may be determined to be primarily acquired.

The channel display apparatus 300 that functions as a server may determine an order of update of the real-time channel thumbnails to be re-acquired according to the user's request. More specifically, the channel display apparatus 300 may determine that the real-time channel thumbnails needed for configuring an image requested by the user are re-acquired first and then, the other stale real-time channel thumbnails are replaced.

Meanwhile, when the order of re-acquisition of the real-time channel thumbnails is determined, the channel display apparatus 300 that functions as a server may setup the schedule by allocating the re-acquisition work of the real-time channel thumbnails to be updated to a plurality of TVs. For example, the channel display apparatus 300 may setup a schedule so that a first TV in the network acquires the real-time channel thumbnail of channel No. 5, and a second TV in the network acquires the real-time channel thumbnail of channel No. 6.

According to an exemplary embodiment, the channel display apparatus 300 that functions as a server may share the setup work schedule through the network.

A channel display apparatus that is requested in the network may acquire the requested real-time channel thumbnail and may share it through the network.

Accordingly, in an exemplary embodiment, since a plurality of real-time channel thumbnails are shared through a network, a quick acquisition of a real-time channel thumbnail with respect to the entire channels is possible by the channel display apparatus 300, and thus, the time required for configuring a user UI that includes a real-time channel thumbnail may be reduced.

Meanwhile, exemplary embodiments can be written as computer programs and can be implemented in general-use digital computers that execute the programs using a non-transitory computer readable recording medium.

The non-transitory computer readable recording medium may be any usable medium that may be accessed by a computer, and may include any usable medium, such as, a volatile and non-volatile medium and a discrete type and non-discrete type medium. Also, the non-transitory computer readable recording medium may include all computer storing media and communication media. The computer storing medium may include any medium, such as, a volatile and non-volatile medium and a discrete type and non-discrete type medium that is realized by a method or technique for storing information, such as, a computer readable command, a data structure, a program module, or other data. The communication medium typically includes a computer-readable command, a data structure, a program module, other data of a modulated data signal, or another transmission mechanism, and an example thereof includes an arbitrary information transmission medium.

While exemplary embodiment have been particularly shown and described with reference to Figures, it will be understood by those of ordinary skill in the art that various changes in form and details may be made therein without departing from the spirit and scope of an inventive concept as defined by the appended claims and their equivalents. Exemplary embodiments should be considered in descriptive sense only and not for purposes of a limitation. Therefore, the scope of an inventive concept is defined not by the detailed description of exemplary embodiments but by the appended claims, and their equivalents and all differences within the scope will be construed as being included in the present disclosure.

What is claimed is:

1. A channel display apparatus comprising:
   a communicator configured to communicate with a network for sharing a plurality of real-time channel thumbnails, wherein, in the network, the real-time channel thumbnails are exchanged between a plurality of channel display apparatuses having a same unique identifier (ID); and
   a processor configured to control the communicator to acquire at least one real-time channel thumbnail from among the plurality of real-time channel thumbnails and configured to control the communicator to transmit the acquired at least one real-time channel thumbnail to the network,
   wherein the unique ID is generated based on regional information and channel information that are input in response to an initial channel setup, and the channel display apparatuses having the same regional information and channel information have the same unique ID.

2. The channel display apparatus of claim 1, wherein the processor is further configured to control the communicator to receive the at least one real-time channel thumbnail from among the plurality of real-time channel thumbnails from the network.

3. The channel display apparatus of claim 1, wherein the processor is further configured to control the communicator to transmit an acquired real-time channel thumbnail to a server in response to a determination of one of: that the acquired real-time channel thumbnail is most recent one for a channel and that a channel does not have a corresponding real-time channel thumbnail stored in the server, and wherein the determination is based on comparing between the acquired real-time channel thumbnail stored by the channel display apparatus and the corresponding real-time channel thumbnail stored in the server.

4. The channel display apparatus of claim 1, further comprising a tuner, wherein
   the processor is further configured to control the tuner to acquire a real-time channel thumbnail in response to a request for a real-time channel thumbnail from a server of the network, and
   the communicator is further configured to transmit the acquired real-time channel thumbnail to the server.

5. The channel display apparatus of claim 1, wherein:
   the processor is further configured to determine whether a plurality of stored real-time channel thumbnails have expired based on an acquisition time of the respective real-time channel thumbnail, and is further configured to determine a priority order for requesting a plurality of at least one of expired real-time channel thumbnails and non-existing real-time channel thumbnails, and
   the communicator transmits a request for one from among the plurality of expired and non-existing real-time channel thumbnails based on the priority order.

6. The channel display apparatus of claim 1, wherein the processor is further configured to control mobile devices that are connected to the channel display apparatus or that are recognized by the channel display apparatus to share in the acquisition of new real-time channel thumbnails by adding the mobile devices to the network.

7. The channel display apparatus of claim 1, further comprising a display configured to display a screen comprising the at least one real-time channel thumbnail from among the plurality of real-time channel thumbnails on a user interface (UI).

8. A channel display apparatus comprising:
   a communicator configured to communicate with a network for sharing a plurality of real-time channel thumbnails, wherein, in the network, the real-time channel thumbnails are exchanged between a plurality of channel display apparatuses having a same unique identifier (ID); and
   a processor configured to control the communicator to setup a schedule for acquiring the plurality of real-time channel thumbnails by using tuners of a plurality of channel display apparatuses connected to the network, and configured to control the communicator to transmit a request for real-time channel thumbnails that need to be acquired from among the plurality of real-time channel thumbnails to the channel display apparatuses based on the schedule, wherein the unique ID is generated based on regional information and channel information that are input in response to an initial channel setup, and the channel display apparatuses having the same regional information and channel information have the same unique ID.

9. The channel display apparatus of claim 8, wherein the processor is further configured to allocate an operation of updating the plurality of real-time channel thumbnails and an operation of acquiring new real-time channel thumbnails from among the plurality of real-time channel thumbnails to the plurality of channel display apparatuses.

10. The channel display apparatus of claim 8, wherein the processor is further configured to determine a priority order of the real-time channel thumbnails that need to be acquired of the plurality of real-time channel thumbnails, and is further configured to determine a schedule for acquiring real-time channel thumbnails that need to be acquired based on the priority order, and the communicator is further configured to transmit a request for acquiring the real-time channel thumbnail to the plurality of channel display apparatuses according to the schedule.

11. The channel display apparatus of claim 10, wherein the processor is further configured to determine whether each of the plurality of real-time channel thumbnails has expired and further configured to determine an order of generating for said each of the plurality of real-time channel thumbnails based on an acquisition time of said each of the plurality of real-time channel thumbnails, and is further configured to determine a priority order of acquisition of the plurality of real-time channel thumbnails based on expiration and the order of generation, wherein the processor is further configured to determine expiration based on whether the acquisition time of the real-time channel thumbnails is greater than a predefined time.

12. The channel display apparatus of claim 8, wherein the processor is further configured to transfer functions of the processor and the communicator to another channel display apparatus on the network from among the plurality of channel display apparatuses in response to the channel display apparatus being changed to a power waiting mode or being turned off.

13. The channel display apparatus of claim 8, wherein the processor is configured to request a real-time channel thumbnail by activating a first communicator of a first channel display apparatus that is in a power waiting mode from among the plurality of channel display apparatuses in response to a second channel display apparatus that is in operation being required for at least one of: acquiring and updating the real-time channel thumbnail on the network.

14. A method of controlling a channel display apparatus, the method comprising:

communicating, by the channel display apparatus, with a network for sharing a plurality of real-time channel thumbnails, wherein, in the network, the real-time channel thumbnails are exchanged between a plurality of channel display apparatuses having a same unique identifier (ID);

acquiring, by the channel display apparatus, at least one real-time channel thumbnail from among the plurality of real-time channel thumbnails; and transmitting, by the channel display apparatus, the acquired at least one real-time channel thumbnail to the network, wherein the unique ID is generated based on regional information and channel information that are input in response to an initial channel setup, and the channel display apparatuses having the same regional information and channel information have the same unique ID.

15. A method of controlling a channel display apparatus, the method comprising:

communicating, by the channel display apparatus, with a network for sharing a plurality of real-time channel thumbnails, wherein, in the network, the real-time channel thumbnails are exchanged between a plurality of channel display apparatuses having a same unique identifier (ID);

setting up, by the channel display apparatus, a schedule for acquiring the plurality of real-time channel thumbnails by using tuners of a plurality of channel display apparatuses connected to the network; and requesting, by the channel display apparatus from another channel display apparatus from among the plurality of channel display apparatuses, a real-time channel thumbnail that needs to be acquired from among the plurality of real-time channel thumbnails based on the schedule, wherein the unique ID is generated based on regional information and channel information that are input in response to an initial channel setup, and the channel display apparatuses having the same regional information and channel information have the same unique ID.

16. A non-transitory computer readable recording medium having recorded thereon programs for realizing the method of claim 14.

17. A non-transitory computer readable recording medium having recorded thereon programs for realizing the method of claim 15.

* * * * *